United States Patent
Kinoshita

(10) Patent No.: US 11,710,842 B2
(45) Date of Patent: Jul. 25, 2023

(54) MANUFACTURING METHOD FOR FUEL CELL

(71) Applicant: TOYOTA JIDOSHA KABUSHIKI KAISHA, Toyota (JP)

(72) Inventor: Katsuhiko Kinoshita, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/590,233

(22) Filed: Feb. 1, 2022

(65) Prior Publication Data

US 2022/0246967 A1 Aug. 4, 2022

(30) Foreign Application Priority Data

Feb. 3, 2021 (JP) .............................. JP2021-015805

(51) Int. Cl.
*H01M 8/04* (2016.01)
*H01M 8/1004* (2016.01)
*H01M 4/88* (2006.01)
*H01M 8/0297* (2016.01)

(52) U.S. Cl.
CPC ....... *H01M 8/1004* (2013.01); *H01M 4/8807* (2013.01); *H01M 4/8875* (2013.01); *H01M 8/0297* (2013.01)

(58) Field of Classification Search
CPC ............. H01M 8/1004; H01M 8/0297; H01M 4/8807; H01M 4/8875
See application file for complete search history.

(56) References Cited

U.S. PATENT DOCUMENTS

2019/0288298 A1* 9/2019 Suzuki .................... B32B 9/046
2019/0305330 A1 10/2019 Kinoshita

FOREIGN PATENT DOCUMENTS

| JP | 2016201183 A | 12/2016 |
| JP | 2017068956 A | 4/2017 |
| JP | 2019175734 A | 10/2019 |

* cited by examiner

*Primary Examiner* — Olatunji A Godo
(74) *Attorney, Agent, or Firm* — Hunton Andrews Kurth LLP

(57) ABSTRACT

A manufacturing method for a fuel cell may comprise preparing an electrode sheet including at least an electrolyte membrane; arranging a joining material constituted of a thermoplastic resin in a frame shape on the electrolyte membrane; arranging a support frame having an opening on the joining material arranged on the electrolyte membrane; performing a first laser irradiation process in which the support frame is irradiated with a laser beam such that a first portion of the joining material between the support frame and the electrolyte membrane melts and the electrolyte membrane and the support frame are welded to each other; and performing a second laser irradiation process in which a second portion of the joining material that is positioned inside the opening of the support frame is irradiated with a laser beam such that the second portion of the joining material melts and is welded to the electrolyte membrane.

9 Claims, 14 Drawing Sheets

MANUFACTURING METHOD FOR FUEL CELL

CROSS-REFERENCE TO RELATED APPLICATION

This application claims priority to Japanese patent application No. 2021-015805, filed on Feb. 3, 2021, the entire contents of which are incorporated herein by reference.

TECHNICAL FIELD

The techniques disclosed herein relate to manufacturing methods for a fuel cell.

BACKGROUND

Japanese Patent Application Publication No. 2017-068956 describes a fuel cell. This fuel cell includes an electrode sheet and a support frame joined to the electrode sheet. The electrode sheet includes an electrolyte membrane, a first catalyst layer and a first gas diffusion layer stacked on one surface of the electrolyte membrane, and a second catalyst layer and a second gas diffusion layer stacked on another surface of the electrolyte membrane. The first catalyst layer and the first gas diffusion layer each have a smaller size than the electrolyte membrane in a plan view, and the support frame is joined, via a joining material, to a portion of the surface of the electrolyte membrane that is exposed around the first catalyst layer and the first gas diffusion layer. The joining material is constituted of a thermoplastic resin, and the support frame is joined to the electrode sheet by thermal compression bonding in a hot-pressing process. That is, the support frame and the electrode sheet are joined to each other by melting the joining material between the support frame and the electrode sheet while applying pressure to it in the hot-pressing process.

SUMMARY

In the fuel cell described above, the first catalyst layer and the first gas diffusion layer are positioned inside the opening of the support frame, and there is a space between the opening of the support frame and the first gas diffusion layer. In such a configuration, the thickness of the electrode sheet is locally smaller at the position of the space, and thus stress tends to concentrate on the electrode sheet (especially, the electrolyte membrane) and the electrode sheet may be thereby damaged. In order to avoid this, the joining material between the support frame and the electrode sheet may be extended to within the opening of the support frame to reinforce the electrode sheet. However, it is difficult to sufficiently weld the portion of the joining material within the opening of the support frame to the electrode sheet by merely performing thermal compression bonding to the joining material between the support frame and the electrode sheet via the support frame.

In view of the circumstances above, the disclosure herein provides novel methods to join an electrode sheet to a support frame via a joining material constituted of thermoplastic resin.

A manufacturing method for a fuel cell disclosed herein may comprise preparing an electrode sheet including at least an electrolyte membrane; arranging a joining material constituted of a thermoplastic resin in a frame shape on the electrolyte membrane; arranging a support frame having an opening on the joining material arranged on the electrolyte membrane; performing a first laser irradiation process in which the support frame is irradiated with a laser beam such that a first portion of the joining material between the support frame and the electrolyte membrane melts and the electrolyte membrane and the support frame are welded to each other; and performing a second laser irradiation process in which a second portion of the joining material that is positioned inside the opening of the support frame is irradiated with a laser beam such that the second portion of the joining material melts and is welded to the electrolyte membrane.

The manufacturing method above comprises performing the first laser irradiation process in which the support frame is irradiated with the laser beam and performing the second laser irradiation process in which the second portion of the joining material that is positioned inside the opening of the support frame is irradiated with the laser beam. In the first laser irradiation process, the electrode sheet and the support frame are welded to each other by melting the joining material between the support frame and the electrode sheet. In the second laser irradiation process, the joining material is welded to the electrolyte membrane by melting the second portion of the joining material positioned inside the opening of the support frame. The use of laser irradiation allows for selective melting of the joining material at any position including not only the first portion between the support frame and the electrolyte membrane but also the second portion inside the opening of the support frame. Thus, it is possible to join the support frame and the electrode sheet to each other, while reinforcing a weak portion of the electrode sheet by welding the second portion of the joining material, which extends out from between the support frame and the electrode sheet, to the electrolyte membrane.

DETAILED DESCRIPTION

Figure 1:
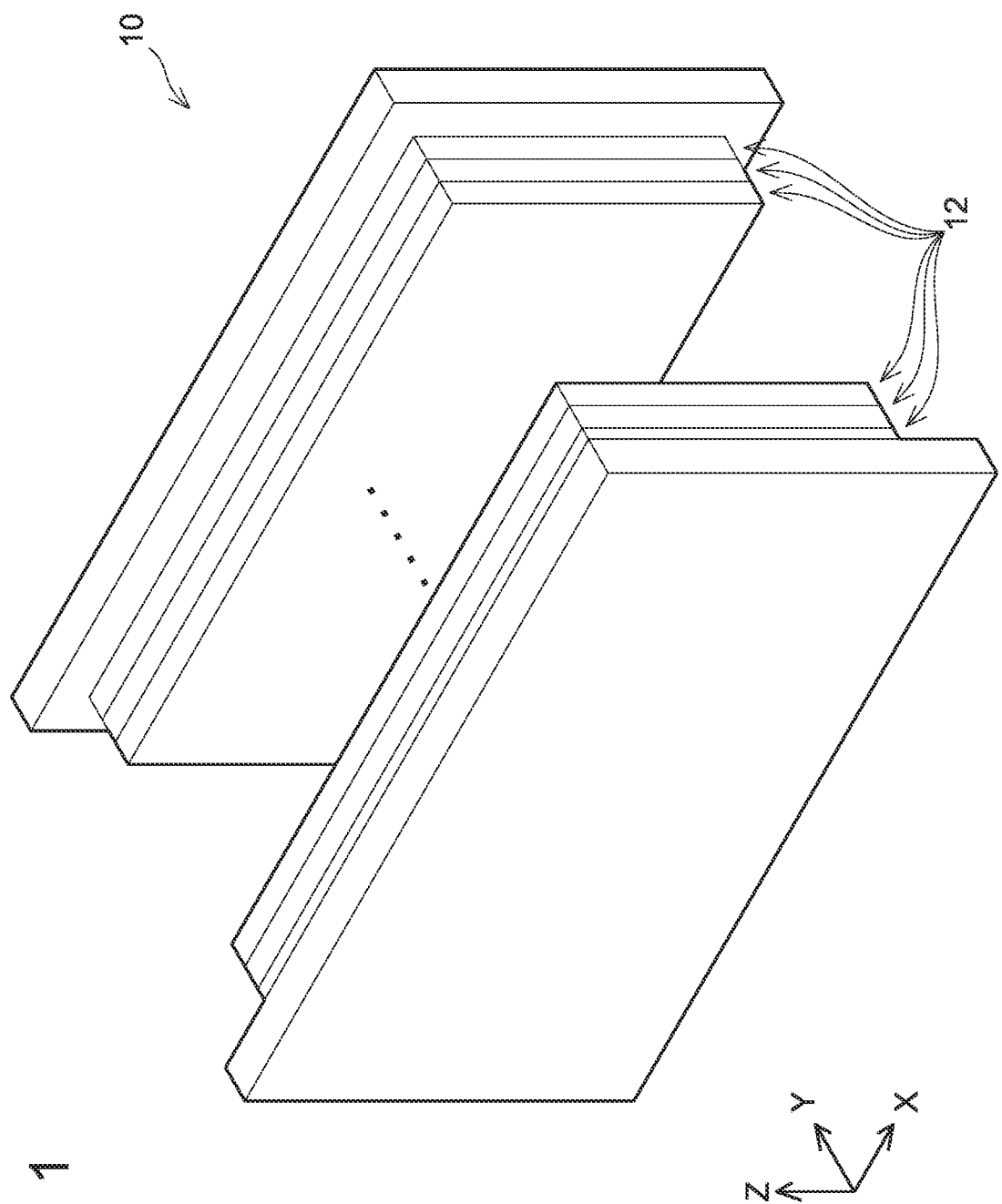
FIG. 1 is a diagram illustrating a schematic configuration of a fuel cell 10 according to an embodiment.

In one embodiment, energy per unit area applied to a laser-irradiated area in the second laser irradiation process may be less than energy per unit area applied to a laser-irradiated area in the first laser irradiation process. In the first laser irradiation process, the joining material is melted by being irradiated with the laser beam via the support frame. Meanwhile, in the second laser irradiation process, the joining material can be directly irradiated with the laser beam without the intervention of the support frame, and thus the joining material can be easily melted. That is, energy per unit area required to melt the joining material is less in the second laser irradiation process than in the first laser irradiation process. Therefore, if the same laser beam is used in the first and second laser irradiation processes, the joining material may not be heated sufficiently in the first laser irradiation process, or the joining material may be heated excessively in the second laser irradiation process. In order to avoid this, energy per unit area applied to the laser-irradiated area in the second laser irradiation process may be less than energy per unit area applied to the laser-irradiated area in the first laser irradiation process, as mentioned above. Thus, in both the first and second laser irradiation processes, the joining material can be heated appropriately, without being heated insufficiently or excessively.

In the above embodiment, an energy density of the laser beam in the second laser irradiation process may be lower than an energy density of the laser beam in the first laser irradiation process. By using different laser beam energy densities in the first and second laser irradiation processes, the energy per unit area applied to the laser-irradiated area can be differentiated. Even general-purpose laser devices can easily change an energy density of a laser beam for irradiation. Thus, process simplification and space-saving associated with it can be achieved without a need for a special device.

In the above embodiment, a scan speed of the laser beam in the second laser irradiation process may be faster than a scan speed of the laser beam in the first laser irradiation process. Also by using different laser beam scan speeds in the first and second laser irradiation processes, energy per unit area applied to the laser-irradiated area can be differentiated. In this case, different laser beam energy densities may not necessarily be used. Even general-purpose laser devices can easily change a scan speed of a laser beam. Thus, process simplification and space-saving associated with it can be achieved without a need for a special device.

In one embodiment, in the first laser irradiation process, the laser beam may be scanned such that the laser beam follows at least once a line extending all a way around the support frame having a frame shape, and in the second laser irradiation process, the laser beam may be scanned such that the laser beam follows at least once a line extending all a way around the second portion of the joining material exposed inside the opening of the support frame in a frame shape. In this case, the laser beam track may be continuous or interruptive in each of the first and second laser irradiation processes. However, when the laser beam tracks continuously extend all the way around without any interruption, sealing performance of the joining material can be enhanced between the support frame and the electrode sheet.

In each embodiment described above, in the arranging the joining material in the frame shape, tape materials constituted of a thermoplastic resin may be used and the plurality of tape materials may be arranged in the frame shape. In this case, in order to enhance the sealing performance of the joining material, the tape materials may be arranged such that end portions of adjacent tape materials overlap each other with no space therebetween. However, this arrangement locally increases the thickness of the joining material at positions where the tape materials overlap, which may cause an unintended stress concentration on the electrode sheet and/or the support frame. In order to avoid this, the tape materials may be arranged at intervals such that adjacent tape materials do not overlap, however, such intervals lead to a decrease in the sealing performance of the joining material.

In view of the above, in one embodiment of the techniques disclosed herein, the arranging the joining material in the frame shape may comprise: arranging a plurality of first tape materials constituted of the thermoplastic resin in the frame shape on the electrolyte membrane; and stacking a plurality of second tape materials constituted of the thermoplastic resin in the frame shape on the plurality of first tape materials. In this case, the first tape materials may be arranged to define a first interval between each pair of the first tape materials, and the second tape materials may be arranged to define a second interval between each pair of the second tape materials, wherein the second intervals are at different positions from the first intervals. In this case, each of the plurality of first tape materials and each of the plurality of second tape materials may have a linear shape having a same width, but the shape is not limited thereto.

According to such a manufacturing method, since the adjacent first tape materials do not overlap each other and the adjacent second tape materials do not overlap each other either, it is possible to avoid unintended stress concentration on the electrode sheet and/or the support frame. Further, the joining material including a double layer structure of the plurality of first tape materials and the plurality of second tape materials allows for a reduction in the thickness of the tape materials in each layer and a reduction in space between the adjacent tape materials in each layer. Furthermore, since the intervals between the first tape materials are at positions different from the positions of the intervals between the second tape materials, there is no possibility that those intervals are combined to form large spaces. Thus, a decrease in the sealing performance of the joining material can be avoided or suppressed.

In the above embodiment, the method may further comprise performing a hot-pressing process after the first and second laser irradiation processes. In the hot-pressing process, the first portion of the joining material may remelt and the electrolyte membrane and the support frame may be bonded by thermal compression bonding. In this case, at least a gas diffusion layer may be bonded to the electrode sheet by thermal compression bonding at a same time as the electrolyte membrane and the support frame are bonded by thermal compression bonding, but it is not limited thereto. According to such a manufacturing method, the support frame and the electrode sheet can be firmly bonded to each other and it is ensured that a weak portion of the electrode sheet can be reinforced by bonding the second portion of the joining material that extends from between the support frame and the electrode sheet to the electrolyte membrane. Further, by covering a surface of the electrolyte membrane with the joining material (and other constituent member(s) with gas impermeability), it is possible to suppress a leak of gases (e.g., hydrogen gas and oxygen gas) supplied to the electrolyte membrane to the other electrode side through the electrolyte membrane.

Another manufacturing method for a fuel cell is also disclosed herein. The manufacturing method may comprise preparing an electrode sheet including at least an electrolyte membrane; arranging a joining material constituted of a thermoplastic resin in a frame shape on the electrolyte membrane; arranging a support frame having an opening on the joining material arranged on the electrolyte membrane; and melting the joining material to bond the electrolyte membrane and the support frame by thermal compression bonding. The arranging the joining material in the frame shape may comprise arranging a plurality of first tape materials constituted of the thermoplastic resin in the frame shape on the electrolyte membrane; and stacking a plurality of second tape materials constituted of the thermoplastic resin in the frame shape on the plurality of first tape materials. The first tape materials are arranged to define a first interval between each pair of the first tape materials, and the second tape materials are arranged to define a second interval between each pair of the second tape materials, wherein the second intervals are at different positions from the first intervals.

EMBODIMENTS

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved manufacturing methods for fuel cell, as well as methods for using and manufacturing the same.

Moreover, combinations of features and steps disclosed in the following detailed description may be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Referring to the drawings, a fuel cell 10 and a manufacturing method thereof according to an embodiment are described. As illustrated in FIG. 1, the fuel cell 10 comprises a plurality of cells 12 of the fuel cell. Each of the cells 12 is arranged parallel to an X-axis and a Z-axis, and the cells 12 are stacked in a Y-axis. Although details will be described later, each cell 12 is a constituent element that is capable of generating electricity independently. The fuel cell 10 can be used in a vehicle powered by a fuel cell, such as a fuel cell vehicle, although the application is not limited thereto.

Figure 2:
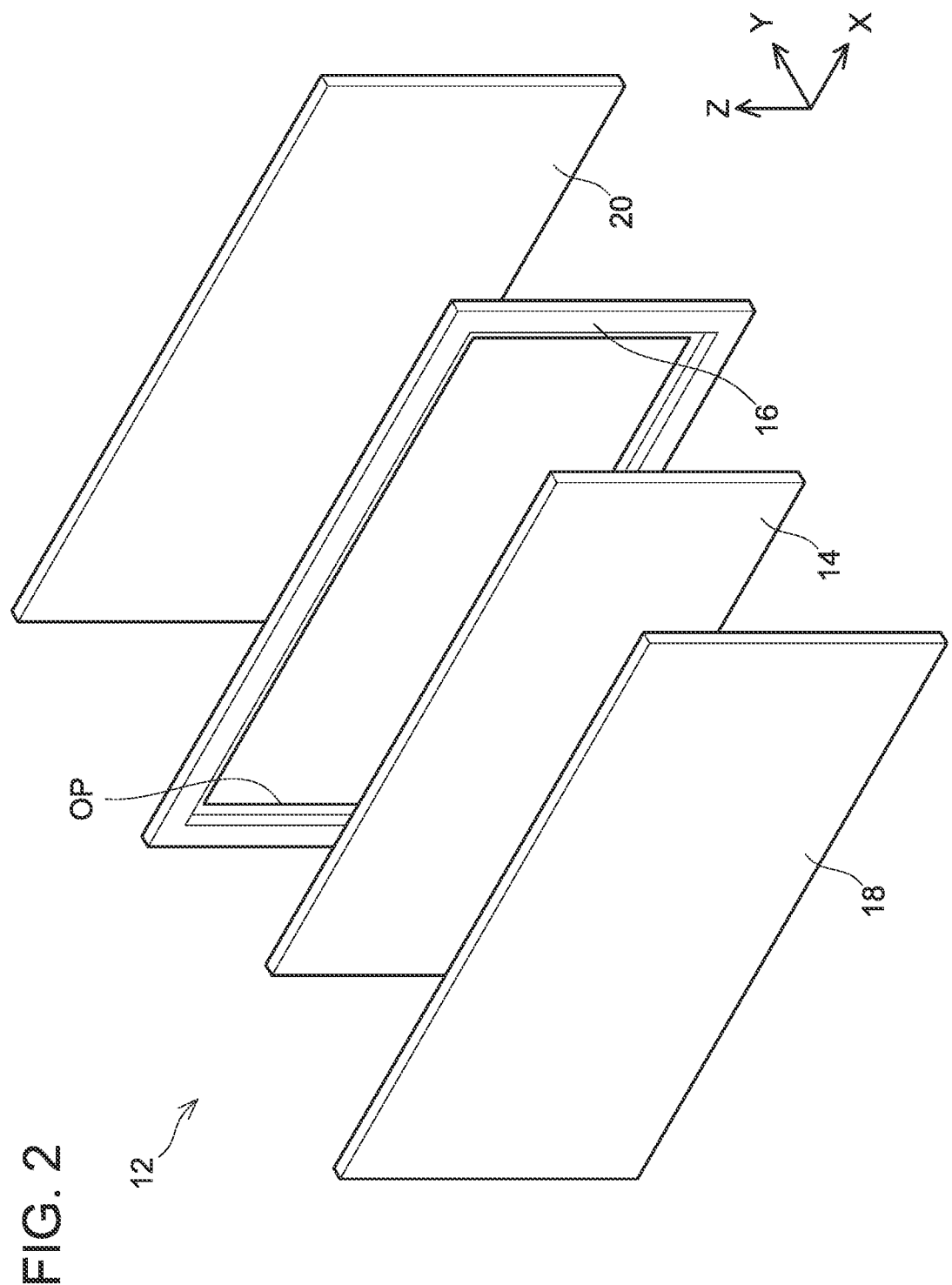
FIG. 2 is an exploded view illustrating a schematic configuration of a cell 12 of the fuel cell.

As illustrated in FIG. 2, each cell 12 comprises a membrane electrode and gas diffusion layer assembly (abbreviated as MEGA hereinafter) 14, a support frame 16, an anode-side separator 18, and a cathode-side separator 20. The MEGA 14 is an example of electrode sheet and is supported by the support frame 16 surrounding the periphery of the MEGA 14. The MEGA 14 and the support frame 16 are interposed between the anode-side separator 18 and the cathode-side separator 20. The anode-side separator 18 and the cathode-side separator 20 are each configured of a gas-impermeable conductive material, for example, a plate-shaped member formed of metal(s) such as titanium or a titanium alloy.

Figure 3:
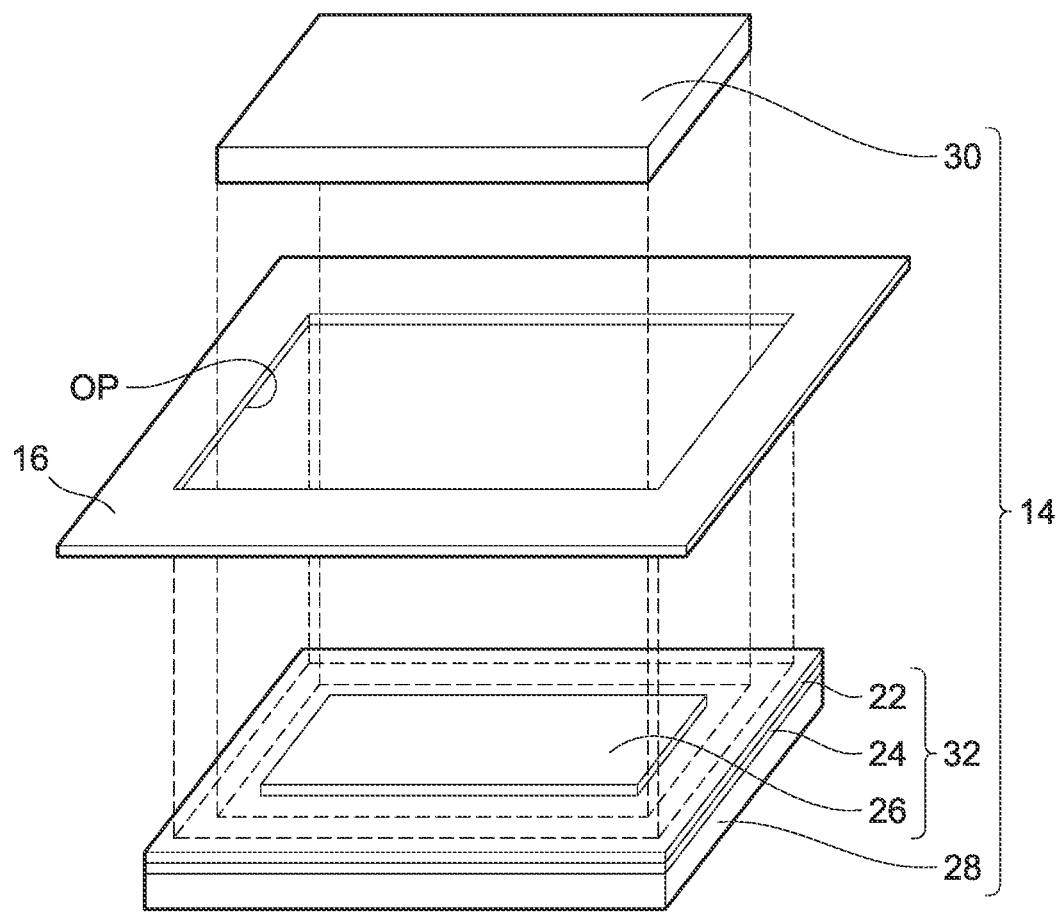
FIG. 3 is an exploded view illustrating a schematic configuration of a MEGA 14.

As illustrated in FIG. 3, the MEGA 14 comprises an electrolyte membrane 22, an anode catalyst layer 24, a cathode catalyst layer 26, an anode gas diffusion layer 28, and a cathode gas diffusion layer 30. The electrolyte membrane 22, the anode catalyst layer 24, and the cathode catalyst layer 26 each have a rectangular shape. The electrolyte membrane 22 is interposed between the anode catalyst layer 24 and the cathode catalyst layer 26, and these three elements configure a membrane electrode assembly (abbreviated as "MEA" hereinafter) 32. The anode gas diffusion layer 28 and the cathode gas diffusion layer 30 each have a rectangular shape. The MEA 32 is interposed between the anode gas diffusion layer 28 and the cathode gas diffusion layer 30, and these three elements configure the MEGA 14. The electrolyte membrane 22 is configured of a protic ion-exchange membrane constituted of a fluorine-based ion-exchange resin, for example. The anode catalyst layer 24 and the cathode catalyst layer 26 are constituted of a porous material in which carbon particles carrying a catalyst, such as platinum, are connected with each other, for example. The anode gas diffusion layer 28 and the cathode gas diffusion layer 30 are constituted of a gas-impermeable conductive material, such as a carbon porous body or a metal porous body, for example.

Figure 4:
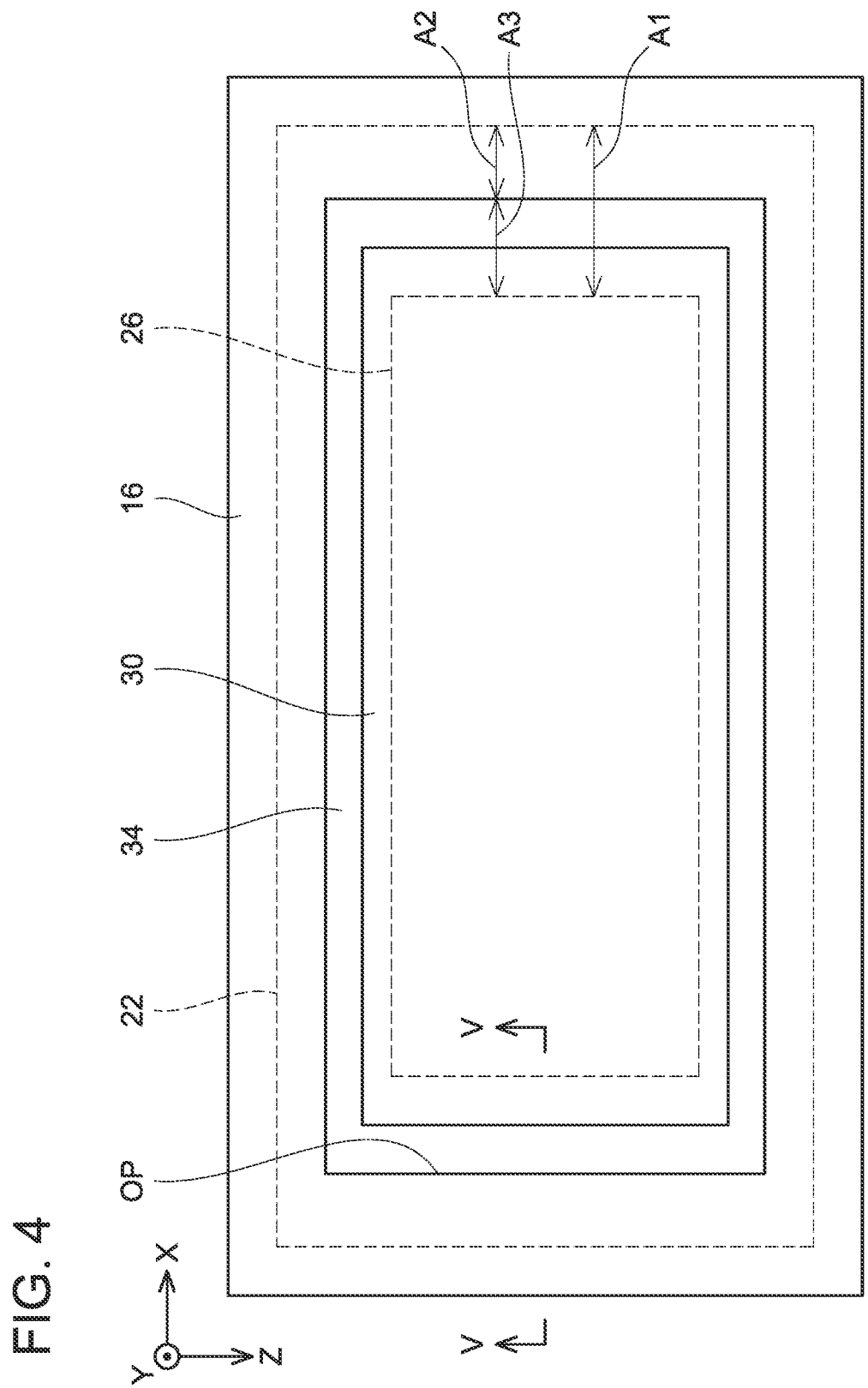
FIG. 4 is a top view of the MEGA 14.

As illustrated in FIG. 4, as viewed perpendicular to the electrolyte membrane 22, the contours of the anode catalyst layer 24 and the anode gas diffusion layer 28 are in the same size as the contour of the electrolyte membrane 22. The contours of the cathode catalyst layer 26 and the cathode gas diffusion layer 30 are smaller than the contour of the electrolyte membrane 22. Further, the contour of the cathode catalyst layer 26 is smaller than the contour of the cathode gas diffusion layer 30. However, the relationship between the sizes of the contours of the cathode catalyst layer 26 and the cathode gas diffusion layer 30 is not limited to the relationship described above. That is, the contour of the cathode catalyst layer 26 may be larger than the contour of the cathode gas diffusion layer 30.

As illustrated in FIG. 4, as viewed perpendicular to the electrolyte membrane 22, the support frame 16 has a frame shape including an opening OP. The opening OP is larger than the contours of the cathode catalyst layer 26 and the cathode gas diffusion layer 30. The support frame 16 comprises a triple-layer structure including a core material and adhesive layers that are formed on front and back surfaces of the core material 16a, respectively. The core material 16a is constituted of thermosetting resin such as epoxy resin or phenol resin. The two adhesive layers 16b, 16c are constituted of thermoplastic resin such as polypropylene resin or epoxy resin. As described, the support frame 16 supports the MEGA 14 (i.e., the electrolyte membrane 22, the anode catalyst layer 24, the cathode catalyst layer 26, the anode gas diffusion layer 28, the cathode gas diffusion layer 30). The core material 16a may be constituted of a thermoplastic resin such as polypropylene resin or polyethylene resin. The support frame 16 includes through holes in which fluids, such as an anode gas and a cathode gas, flow, and bumps and indentations that form flow passages for these fluids, although these are not illustrated.

A joining material 34 is constituted of a thermoplastic resin such as olefin resin. Therefore, the joining material 34 is solid at a temperature equal to or below the melting point, while it melts when heated to or above the melting point. Further, it resolidifies when cooled to or below the melting point after having melted, and remelts when heated to or above the melting point again. That is, the joining material 34 can repeat to melt by heating and solidify by cooling. Although details will be described later, the joining material 34 is a member that welds the electrolyte membrane 22 and the support frame 16 to each other by being melted by laser irradiation. Further, a portion of the joining material 34 extends to the inside of the opening OP of the support frame 16 and is welded to the electrolyte membrane 22 of the MEGA 14, to protect the electrolyte membrane 22. An inner edge of the joining material 34 may spread over a peripheral edge of the cathode catalyst layer 26, which ensures that the joining material 34 covers the electrolyte membrane 22 even when inevitable tolerances are set considering the manufacturing method.

Figure 5:
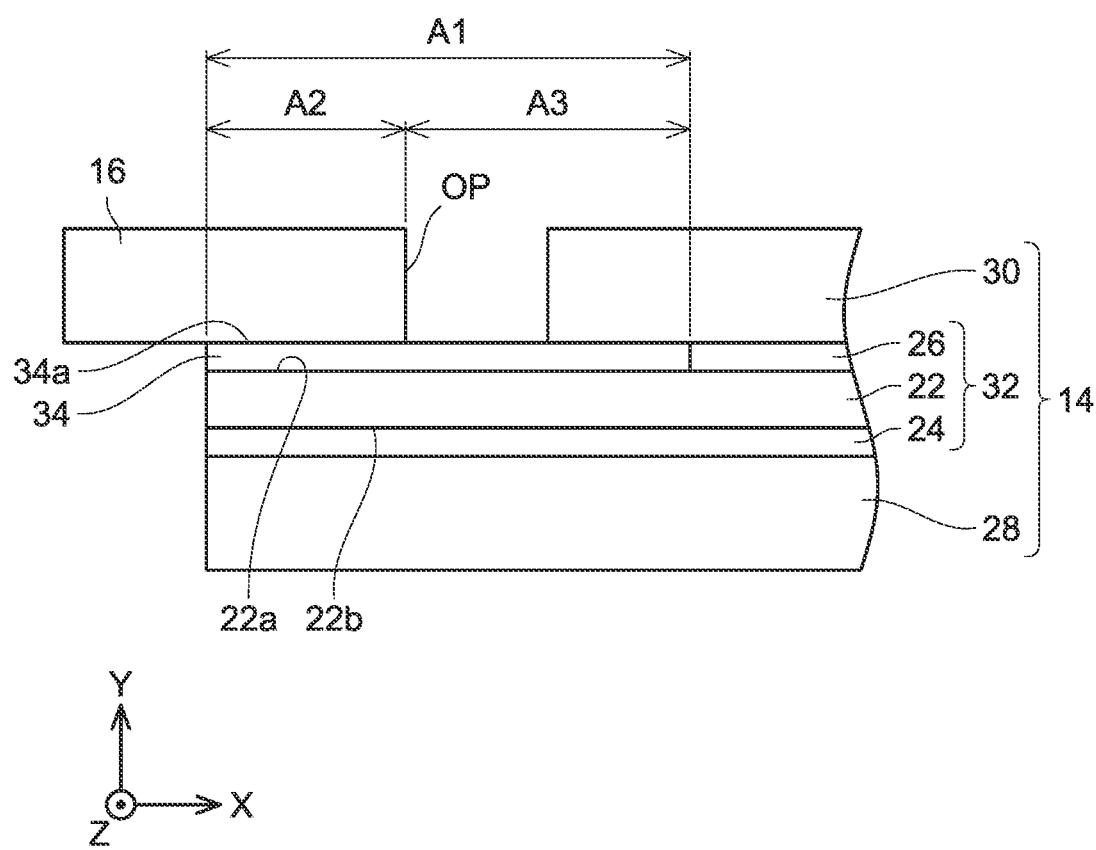
FIG. 5 is a cross-sectional view along a line V-V in FIG. 4.

As illustrated in FIG. 5, the cathode catalyst layer 26 is arranged on an upper surface 22a of the electrolyte membrane 22 (a surface thereof in a +Y direction). Since the contour of the cathode catalyst layer 26 is smaller than the contour of the electrolyte membrane 22, the periphery of the cathode catalyst layer 26 is positioned inward of the periphery of the electrolyte membrane 22. The cathode gas diffusion layer 30 is arranged on the cathode catalyst layer 26. Since the contour of the cathode gas diffusion layer 30 is larger than the contour of the cathode catalyst layer 26 but smaller than the contour of the electrolyte membrane 22, the periphery of the cathode gas diffusion layer 30 is positioned inward of the periphery of the electrolyte membrane 22 and outward of the periphery of the cathode catalyst layer 26. A frame-shaped first region A1 in which the cathode catalyst layer 26 does not exist is formed on the upper surface 22a of the electrolyte membrane 22. The joining material 34 is arranged in the first region A1. Similarly, the anode catalyst layer 24 is arranged on a lower surface 22b of the electrolyte membrane 22 (a surface thereof in a -Y direction). The anode gas diffusion layer 28 is arranged on the anode catalyst layer 24. Since the contours of the electrolyte membrane 22, the anode catalyst layer 24, and the anode gas diffusion layer 28 have the same size, the peripheries of these three elements are aligned.

As illustrated in FIG. 5, the joining material 34 is interposed between the electrolyte membrane 22 and the support frame 16, and joins them with each other. The support frame 16 is arranged on one surface 34a of the joining material 34. The support frame 16 surrounds the periphery of the cathode gas diffusion layer 30, and the cathode gas diffusion layer 30 is positioned inside of the opening OP of the support frame 16. As described, a portion of the joining material 34 extends to the inside of the opening OP of the support frame 16.

Thus, there are a frame-shaped second region A2 in which the support frame 16 is arranged and a frame-shaped third region A3 in which the support frame 16 is not arranged on the one surface 34a of the joining material 34. That is, the first region A1 in which the joining material 34 is arranged can be distinguished between the second region A2 and the third region A3 positioned inward of the second region A2. It should be understood that FIG. 5 illustrates the thicknesses of elements expediently for easier understanding and does not illustrate the actual thicknesses of the elements.

As illustrated in FIG. 4, the first region A1 has a frame shape as viewed perpendicular to the electrolyte membrane 22. The first region A1 coincides with the region where the joining material 34 is arranged, and specifically is a region spanning from the outer periphery of the joining material 34 to the border between the joining material 34 and the cathode catalyst layer 26. As described, the second region A2 and the third region A3 both have a frame shape. The second region A2 is a region spanning from the outer periphery of the joining material 34 to the inner periphery of the support frame 16 that defines the opening OP. The third region A3 is a region spanning from the inner periphery of the support frame 16 that defines the opening OP to the border between the joining material 34 and the cathode catalyst layer 26. In the second region A2, the joining material 34 is interposed between the electrolyte membrane 22 and the support frame 16, and the electrolyte membrane 22 and the support frame 16 are joined to each other by the joining material 34. In the third region A3, the joining material 34 is positioned inside the opening OP of the support frame 16 and the joining material 34 is welded only to the electrolyte membrane 22. Although details will be described later, the second region A2 includes an area that is irradiated with a laser beam in a first laser irradiation process, and the third region A3 includes an area that is irradiated with a laser beam in a second laser irradiation process.

In the configuration described above, the joining material 34 is positioned between the electrolyte membrane 22 and the support frame 16 in the second region A2 and is positioned inside the opening OP of the support frame 16 in the third region A3. Thus, the electrolyte membrane 22 and the support frame 16 are joined to each other by the joining material 34 in the second region A2, while the electrolyte membrane 22 is protected in the third region A3 by the joining material 34 being welded to the electrolyte membrane 22 of the MEGA 14. The configuration above can join the electrolyte membrane 22 of the MEGA 14 to the support frame 16, while reinforcing a weak portion of the MEGA 14, such as the electrolyte membrane 22, by welding the joining material 34, which extends out from between the electrolyte membrane 22 and the support frame 16, to the electrolyte membrane 22.

Figure 6:
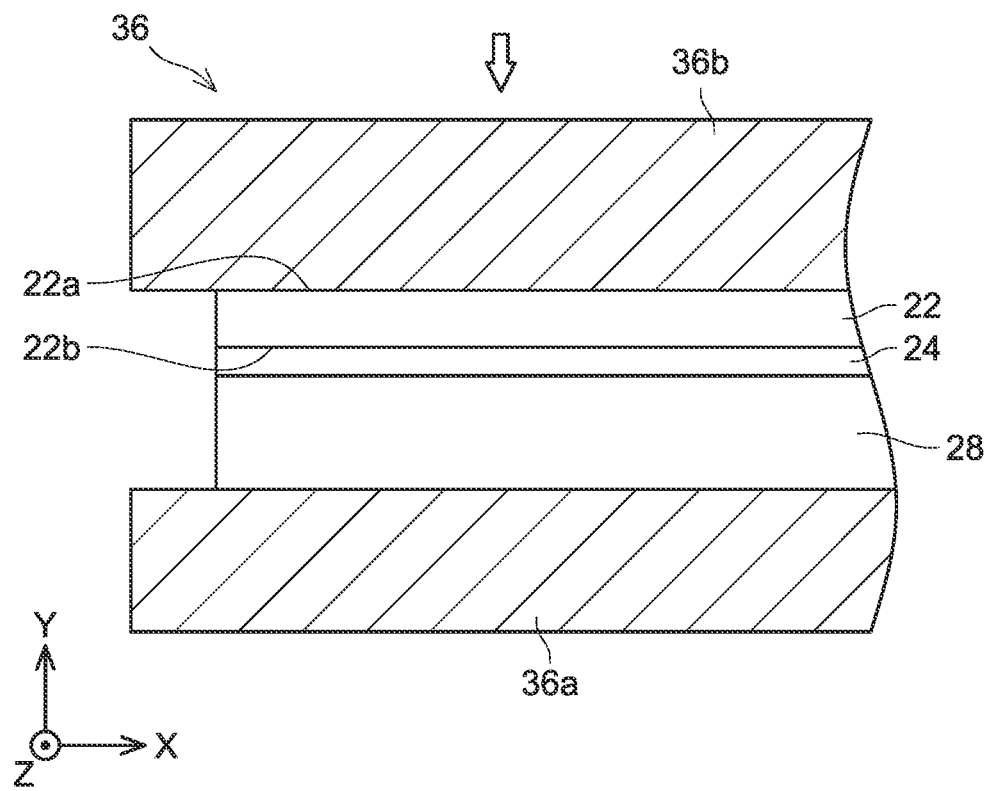
FIG. 6 is a diagram illustrating a process of preparing the MEGA 14 including an electrolyte membrane 22 or a semi-manufactured product thereof.

Referring to FIGS. 6 to 13, a manufacturing method for the fuel cell 10 is described. As illustrated in FIG. 6, a process of preparing the MEGA 14 including the electrolyte membrane 22 or a semi-manufactured product thereof is firstly performed. In this process, the constituent layers of the MEGA 14 are bonded to corresponding surfaces of the electrolyte membrane 22, for example, by using a pressing device 36. The pressing device 36 comprises a stage 36a and an upper die 36b. The anode catalyst layer 24 and the anode gas diffusion layer 28 are stacked on the lower surface 22b of the electrolyte membrane 22, the stack is placed on the stage 36a, and the upper die 36b is then lowered, thereby bonding the three elements together (see FIG. 6). In doing so, a protection film or the like may be placed on the upper surface 22a of the electrolyte membrane 22 to prevent adhesion of foreign matters. After that, similarly, the cathode catalyst layer 26 is arranged on the upper surface 22a of the electrolyte membrane 22, they are placed on the stage 36a, and the upper die 36b is then lowered, thereby bonding the cathode catalyst layer 26 and the electrolyte membrane 22 together. It should be understood that how many times the pressure bonding is performed by the pressing device 36 and/or the pressure bonding order can be appropriately varied depending on the configuration of the MEGA 14 and sizes of contours of the constituent layers of the MEGA 14.

Figure 7:
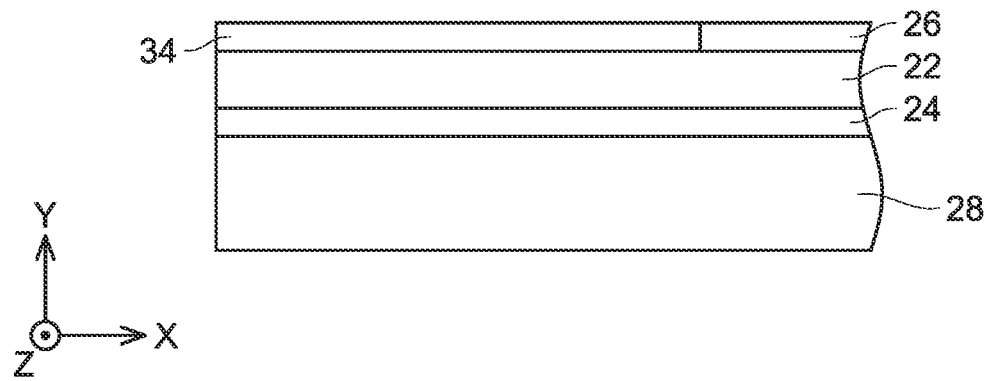
FIG. 7 is a diagram illustrating a process of arranging a joining material 34 on the electrolyte membrane 22.

Then, as illustrated in FIG. 7, a process of arranging the joining material 34 in a frame shape on the electrolyte membrane 22 is performed. In this process, the joining material 34 is arranged on the electrolyte membrane 22, for example, by using an attachment device 38 illustrated in FIG. 8. The attachment device 38 comprises a roll support 40 and a roller 42. In this case, the joining material 34 is prepared as a roll 44 in which a long strip of tape material 48 is rolled annularly. Specifically, as illustrated in FIG. 9, the tape material 48 has a double-layer structure including the joining material 34 constituted of the thermoplastic resin and a backing sheet 46 arranged on one surface of the joining material 34. The roll support 40 and the roller 42 are rotatable about an axis 40a and an axis 42a, respectively. The inner diameter of the roll 44 is approximately equal to the outer diameter of the roll support 40, and the roll 44 is detachably attached to the roll support 40. The width of the joining material 34 may range from 5 mm to 15 mm, for example. However, the width of the joining material 34 can be appropriately varied depending on the size and configuration of the fuel cell 10.

Figure 8:
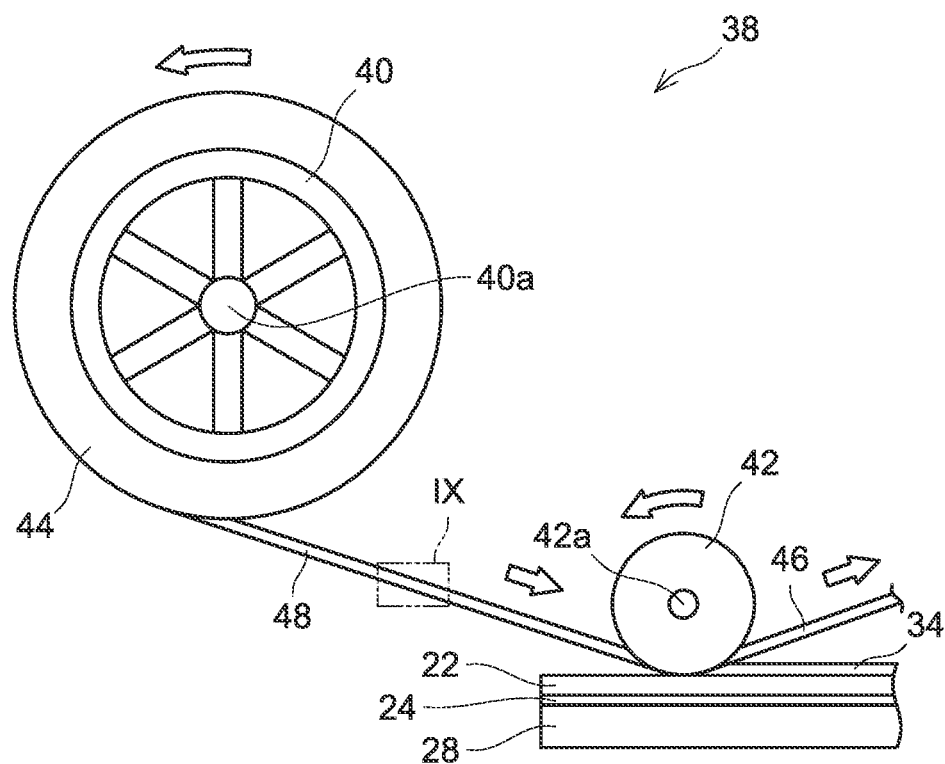
FIG. 8 is a diagram for explaining an attachment device 38 configured to arrange the joining material 34 on the electrolyte membrane 22.
Figure 9:
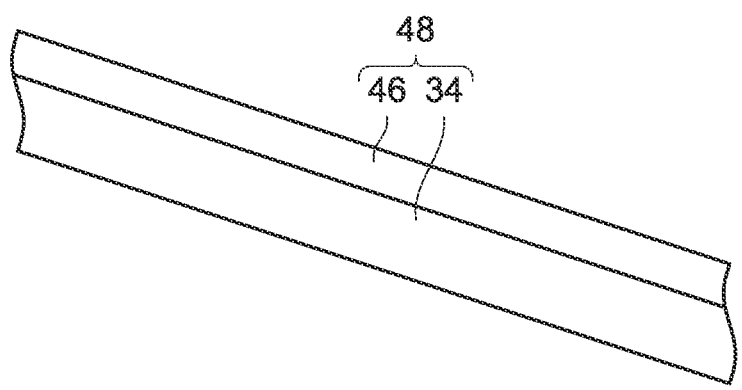
FIG. 9 is an enlarged view of a part IX in FIG. 8.

Referring to FIG. 8, the process of arranging the joining material 34 in a frame shape on the electrolyte membrane 22 is described step-by-step. Firstly, the roll support 40 rotates to feed the double-layer sheet 48, which is annularly rolled in the roll 44, to the roller 42. Then, the roller 42 rotates to press the double-layer sheet 48 against the electrolyte membrane 22 placed on a stage (not illustrated). At this time, the joining material 34 is on a surface of the double-layer sheet 48 that contacts the electrolyte membrane 22, while the backing sheet 46 is on a surface of the double-layer sheet 48 that contacts the roller 42. By the roller 42 pressing the double-layer sheet 48 against the electrolyte membrane 22, the joining material 34 is bonded to the electrolyte membrane 22. After this, the backing sheet 46 is removed from the joining material 34, thereby leaving only the joining material 34 on the electrolyte membrane 22. The joining material 34 may be cut to a required length before bonded to the electrolyte membrane 22, or may be cut after bonded to the electrolyte membrane 22. Further, the joining material 34 may include a layer with another function. For example, the joining material 34 may have a double-layer structure further including a layer that can firmly bond to the electrolyte membrane 22.

Figure 10:
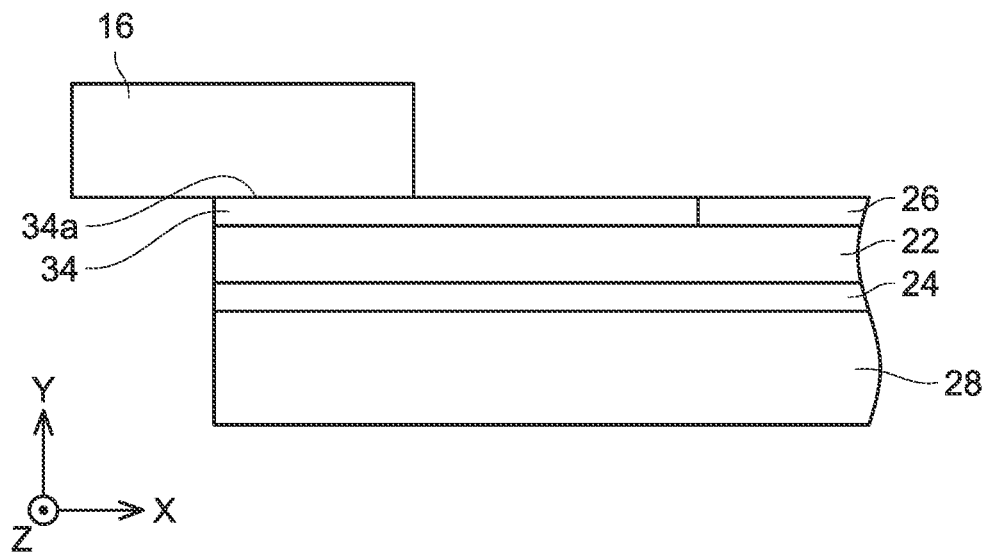
FIG. 10 is a diagram illustrating a process of arranging a support frame 16 on the joining material 34.

Then, as illustrated in FIG. 10, a process of arranging the support frame 16 on the joining material 34 arranged on the electrolyte membrane 22 is performed. The support frame 16 is arranged on the joining material 34 arranged on the electrolyte membrane 22 such that the center of the opening OP of the support frame 16 coincides with the center of the MEGA 14. The contour of the support frame 16 is larger than the contours of the electrolyte membrane 22 of the MEGA 14 and the joining material 34, and the opening OP of the support frame 16 is smaller than the contours of the electrolyte membrane 22 of the MEGA 14 and the joining material 34. As described, since the opening OP of the support frame 16 is larger than the contour of the cathode catalyst layer 26, a portion of the joining material 34 is not covered by the support frame 16 within the opening OP of the support frame 16. However, the position at which the support frame 16 is arranged on the joining material 34 arranged on the electrolyte membrane 22 is not particularly limited. The support frame 16 may be arranged at any position as long as the cathode gas diffusion layer 30 can be arranged inside the opening OP of the support frame 16 in a subsequent process.

Figure 11:
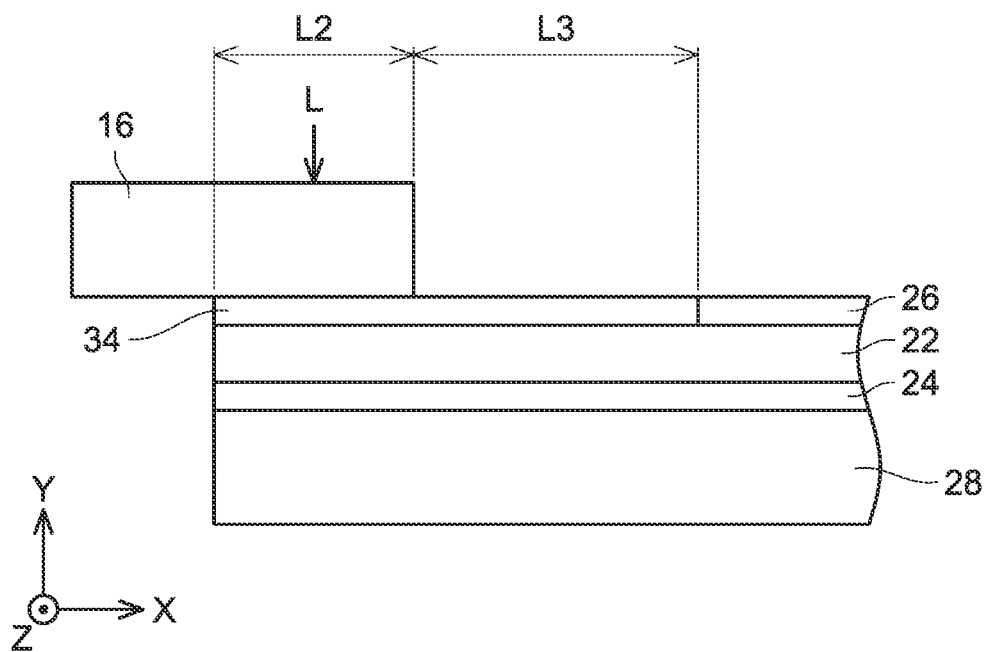
FIG. 11 is a diagram illustrating a first laser irradiation process.
Figure 12:
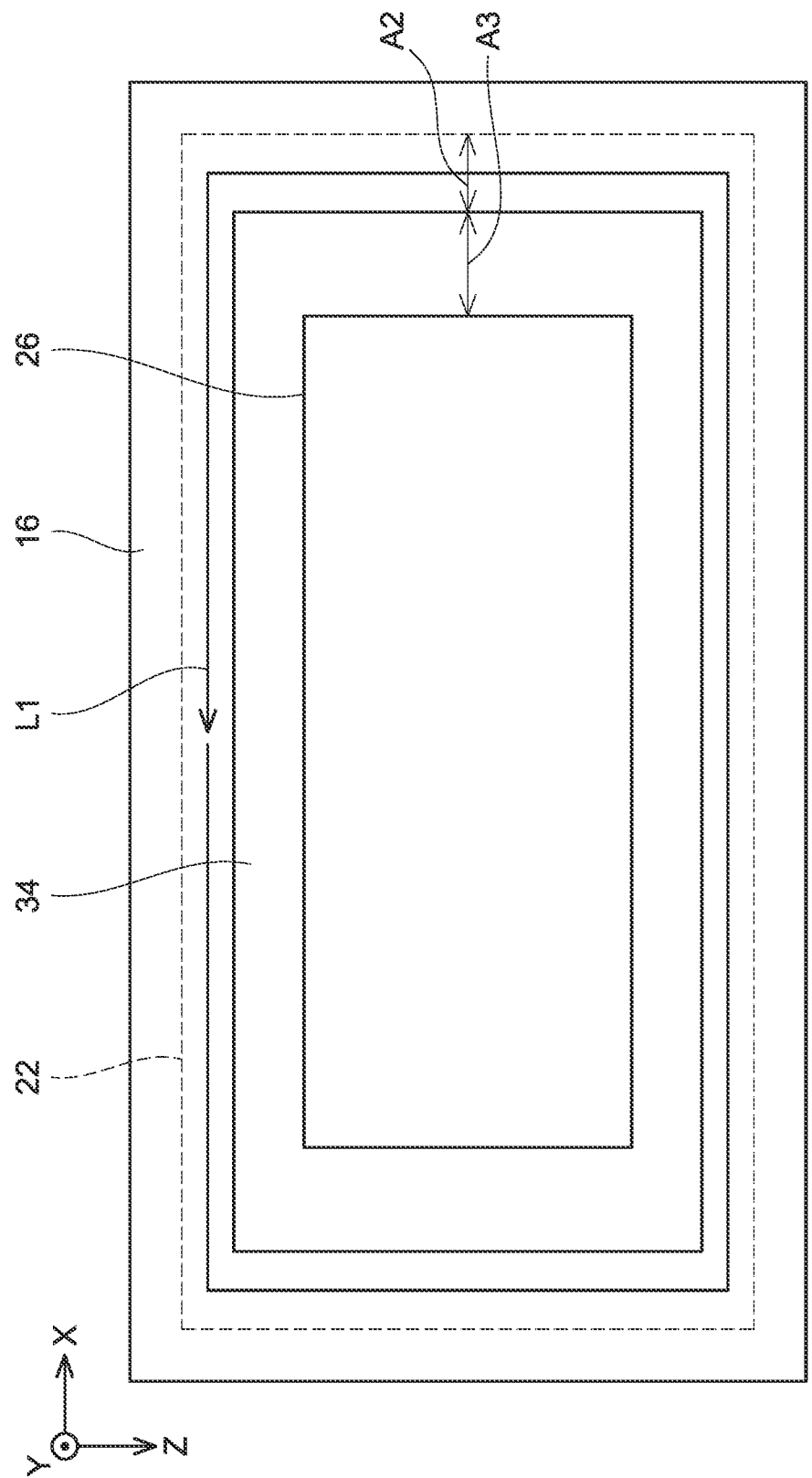
FIG. 12 is a diagram illustrating an irradiation track L1 of laser beam L in the first laser irradiation process.

Subsequently, as illustrated in FIG. 11, a first laser irradiation process is performed. In the first laser irradiation process, the support frame 16 is irradiated with a laser beam L to melt a portion of the joining material 34 that is positioned between the electrolyte membrane 22 and the support frame 16 via the support frame 16. The electrolyte membrane 22 and the support frame 16 are thereby welded to each other via the joining material 34. As illustrated in FIG. 12, an irradiation track L1 of the laser beam L in the first laser irradiation process (which may be termed "first laser irradiation track" hereinafter) is within the second region A2. The irradiation track L1 of the laser beam L in the first laser irradiation process is an example of area irradiated with the laser beam L (laser-irradiated area) in the first laser irradiation process. In the manufacturing method according to the present embodiment, the laser beam L is scanned such that it follows at least once a line extending all the way around the frame-shaped support frame 16, however, it may be scanned differently. That is, within the second region A2, the first laser irradiation track L1 surrounds the opening OP of the support frame 16 at least once outside thereof.

Figure 13:
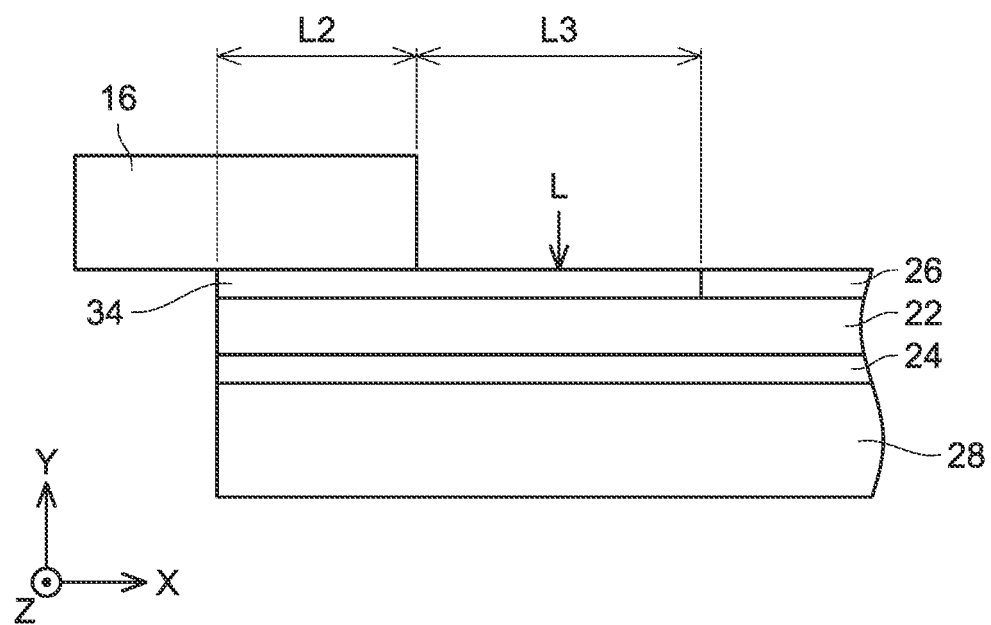
FIG. 13 is a diagram illustrating a second laser irradiation process.
Figure 14:
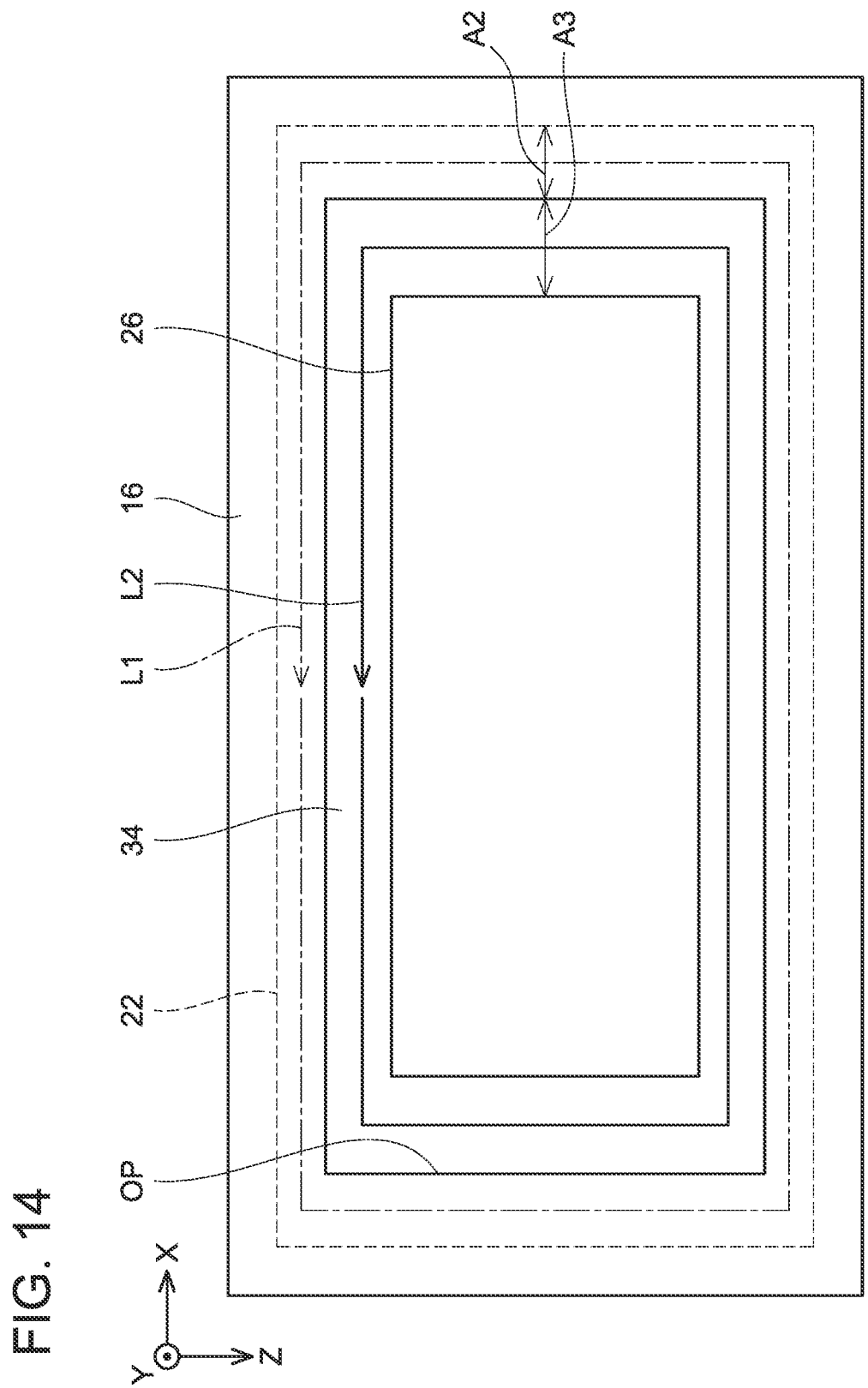
FIG. 14 is a diagram illustrating an irradiation track L2 of laser beam L in the second laser irradiation process.

After the above, as illustrated in FIG. 13, a second laser irradiation process is performed similarly. In the second laser irradiation process, a portion of the joining material 34 that is positioned inside the opening OP of the support frame 16 is melted. By irradiating the portion of the joining material 34 positioned inside the opening OP of the support frame 16 with a laser beam L, the portion of the joining material 34 is melted. The joining material 34 is thereby welded to the electrolyte membrane 22. As illustrated in FIG. 14, an irradiation track L2 of the laser beam L in the second laser irradiation process (which may be termed "second laser irradiation track") is within the third region A3. The irradiation track L2 of the laser beam L in the second laser irradiation process is an example of area irradiated by the laser beam L (laser-irradiated area) in the second laser irradiation process. In the manufacturing method according to the present embodiment, the laser beam L is scanned such that it follows at least once a line extending all the way around the portion of the joining material 34 that is exposed in a frame shape within the opening OP of the support frame 16, however, it may be scanned differently. That is, within the third region A3, the second laser irradiation track L2 extends at least once all the way along the line within the opening OP of the support frame 16 and outside the cathode catalyst layer 26. The first laser irradiation track L1 and the second laser irradiation track L2 are not necessarily independent tracks, but they may be a continuous track. Further, the laser irradiation tracks L1, L2 each may be continuous or interruptive. Furthermore, the order to perform the first laser irradiation process and the second laser irradiation process is not particularly limited. That is, the first laser irradiation process may be performed before the second laser irradiation process as in the present embodiment, or the first laser irradiation process may be performed after the second laser irradiation process.

The manufacturing method described above comprises the first laser irradiation process in which the support frame 16 is irradiated with the laser beam L and the second laser irradiation process in which the portion of the joining material 34 positioned inside the opening OP of the support frame 16 is irradiated with the laser beam L. In the first laser irradiation process, the portion of the joining material 34 positioned between the support frame 16 and the electrolyte membrane 22 of the MEGA 14 is melted, thereby welding the electrolyte membrane 22 and the support frame 16 to each other. In the second laser irradiation process, the portion of the joining material 34 positioned inside the opening OP of the support frame 16 is melted, thereby welding the joining material 34 to the electrolyte membrane 22. The use of irradiation by the laser beam L allows the joining material 34 to be selectively melted at any position including not only the portion positioned between the support frame 16 and the electrolyte membrane 22 but also the portion positioned within the opening OP of the support frame 16. Thus, the support frame 16 and the electrolyte membrane 22 can be joined to each other, while the weak portion of the MEGA 14, such as the electrolyte membrane 22, can be reinforced by melting and welding the portion of the joining material 34 extending out from between the support frame 16 and the electrolyte membrane 22 to the electrolyte membrane 22.

As an example, energy per unit area applied to the second laser irradiation track L2 is less than energy per unit area applied to the first laser irradiation track L1. In the first laser irradiation process, the joining material 34 is melted by irradiating the joining material 34 with the laser beam L via the support frame 16. On the other hand, in the second laser irradiation process, the joining material 34 is directly irradiated with the laser beam L without the intervention of the support frame 16, and thus the joining material 34 can be easily melted. That is, energy per unit area required to melt the joining material 34 is less in the second laser irradiation process than in the first laser irradiation process. With the use of the manufacturing method according to the present variant, the joining material 34 can be heated appropriately, without being heated insufficiently or without being heated excessively, in both the first and second laser irradiation processes. The energy density of the laser beam L for irradiation can be varied in order to differentiate the energy per unit area applied to the first laser irradiation track L1 and the energy per unit area applied to the second laser irradiation track L2. Instead of or in addition to varying the energy density of the laser beam L for irradiation, the energy per unit area applied to the first laser irradiation track L1 and the energy per unit area applied to the second laser irradiation track L2 can also be differentiated by varying the scan speed of the laser beam L.

Figure 15:
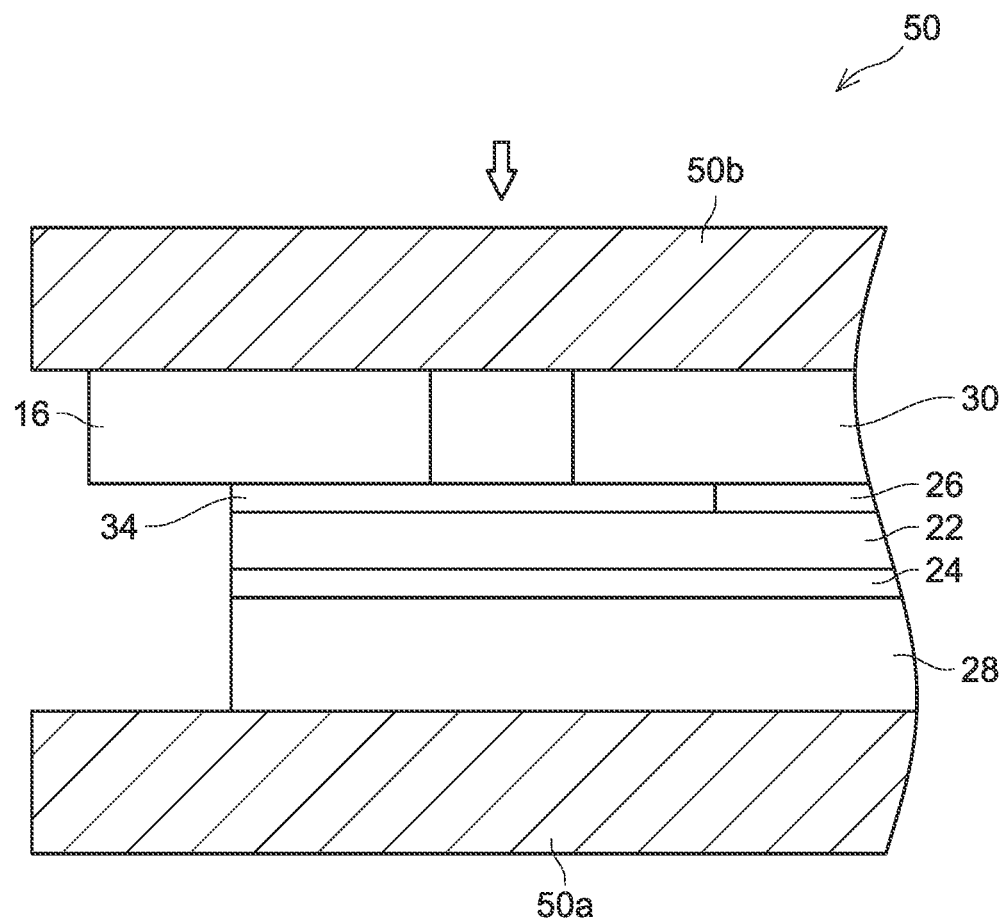
FIG. 15 is a diagram illustrating a hot-pressing process.

After the first and second laser irradiation processes have been performed, a hot-pressing process is performed, as illustrated in FIG. 15. In the hot-pressing process, the portion of the joining material 34 positioned between the support frame 16 and the MEGA 14 is remelted by hot-pressing the MEGA 14 or the semi-manufactured product thereof fixed to the support frame 16, and the support frame 16 is firmly bonded with the electrolyte membrane 22 by thermal compression bonding. In addition, in the hot-pressing process, the cathode gas diffusion layer 30 is arranged on the cathode catalyst layer 26 of the MEGA 14, and the cathode gas diffusion layer 30 is also bonded with the cathode catalyst layer 26 by thermal compression bonding at the same time as the thermal compression bonding of the support frame 16 and the electrolyte membrane 22. As an example, the hot-pressing process may be performed using a pressing device 50 illustrated in FIG. 15. The pressing device 50 comprises a stage 50a and an upper die 50b. The cathode gas diffusion layer 30 is arranged on the cathode catalyst layer 26 and the joining material 34, this assembly is placed on the stage 50a, and the upper die 50b is then lowered, although this is merely an example and non-limiting. The portion of the joining material 34 between the support frame 16 and the electrolyte membrane 22 is thereby remelted, and the electrolyte membrane 22 is bonded with the support frame 16 by thermal compression bonding via the joining material 34.

After the above, other necessary processes are performed, thereby completing the MEGA 14 fixed to the support frame 16. The completed MEGA 14 is then stacked with the anode-side separator 18 and the cathode-side separator 20, thereby configuring the fuel cell 10.

In the process of arranging the tape joining material 34 in a frame shape on the electrolyte membrane 22 of the manufacturing method described above, the tape joining material 34 may be appropriately cut and the cut pieces of the joining material 34 may be arranged linearly in order to avoid stretch and/or creases of the joining material 34. In this case, adjacent tape pieces of the joining material 34 may be arranged such that no space is provided between them and they do not overlap each other in order to enhance the sealing performance of the joining material 34. However, considering manufacturing tolerances, it is difficult to accurately arrange tape pieces of the joining material 34 without space therebetween. Therefore, in another embodiment, the process of arranging the joining material 34 in a frame shape may comprise a process of arranging a plurality of first tape materials 52 in a frame shape on the electrolyte membrane 22 and a process of stacking a plurality of second tape materials 54 in a frame shape on the plurality of first tape materials 52. The first tape materials 52 and the second tape materials 54 are examples of materials that are to be the joining material 34 in the fuel cell 10, and are each constituted of thermoplastic resin such as olefin resin, as with the joining material 34. The first tape materials 52 and the second tape materials 54 may be constituted of the same material or may be constituted of different materials. For example, a material that can firmly bond with the electrolyte membrane 22 may be used as the first tape materials 52, and a material that can firmly bond with the support frame 16 may be used as the second tape materials 54, although this is merely an example and non-limiting.

Figure 16:
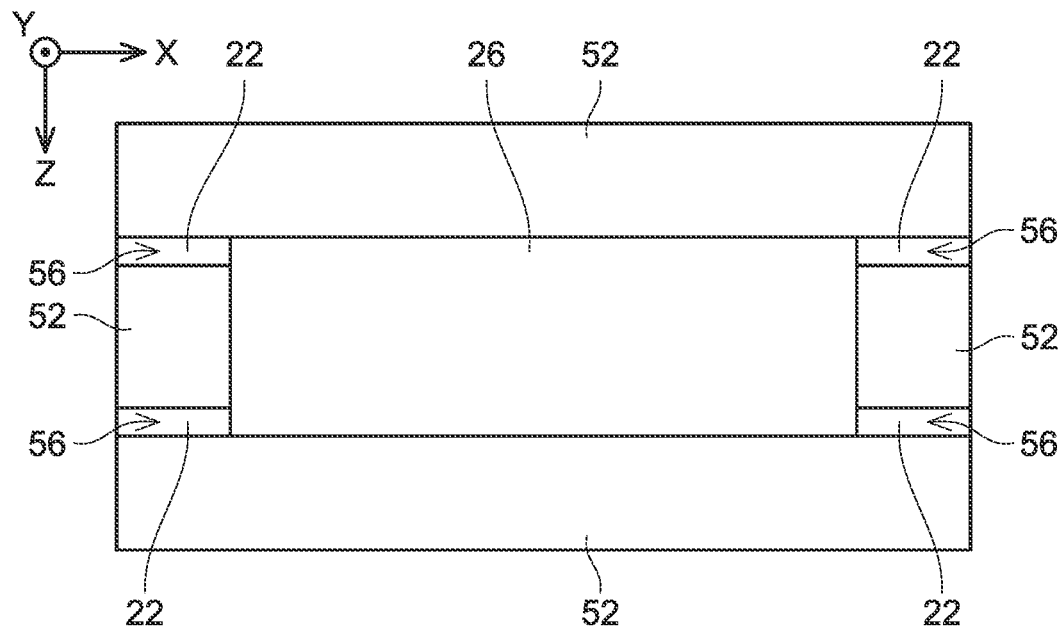
FIG. 16 is a diagram illustrating a process of arranging a plurality of first tape materials 52 on the electrolyte membrane 22.

As illustrated in FIG. 16, the first tape materials 52 are arranged to define a first interval 56 between each pair of adjacent first tape materials 52. Each of the first tape materials 52 has a linear shape having the same width. The plurality of first tape materials 52 includes a pair of the first tape materials 52 arranged along a longitudinal direction of the electrolyte membrane 22 (which may be termed "longitudinal pair of the first tape materials 52" hereinafter) and a pair of the first tape materials 52 arranged along a transverse direction of the electrolyte membrane 22 (which may be termed "transverse pair of the first tape materials 52" hereinafter). In this case, the length of the longitudinal pair of the first tape materials 52 is approximately equal to the length of the electrolyte membrane 22 in the longitudinal direction within the manufacturing tolerance. Here, being within the manufacturing tolerance means being within a range of ±5% from the design value. The length of each of the transverse pair of the first tape materials 52 is smaller than the length of the electrolyte membrane 22 in the transverse direction, such that when the transverse pair of the first tape materials 52 is arranged on the electrolyte membrane 22, the first interval 56 is defined between each pair of adjacent first tape materials 52. Thus, the first intervals 56 are defined between ends of the transverse pair of the first tape materials 52 and longitudinal end portions of the pair of first tape materials 52 adjacent to the transverse pair. The smaller the first intervals 56 are, the better, although this is non-limiting. For example, the first intervals 56 may be smaller than the first tape materials 52, and may be equal to or smaller than ⅕ of the width. The first tape materials 52 may have linear shapes with different widths. For example, the longitudinal pair of the first tape materials 52 may have a different width from the width of the transverse pair of the first tape materials 52.

Figure 17:
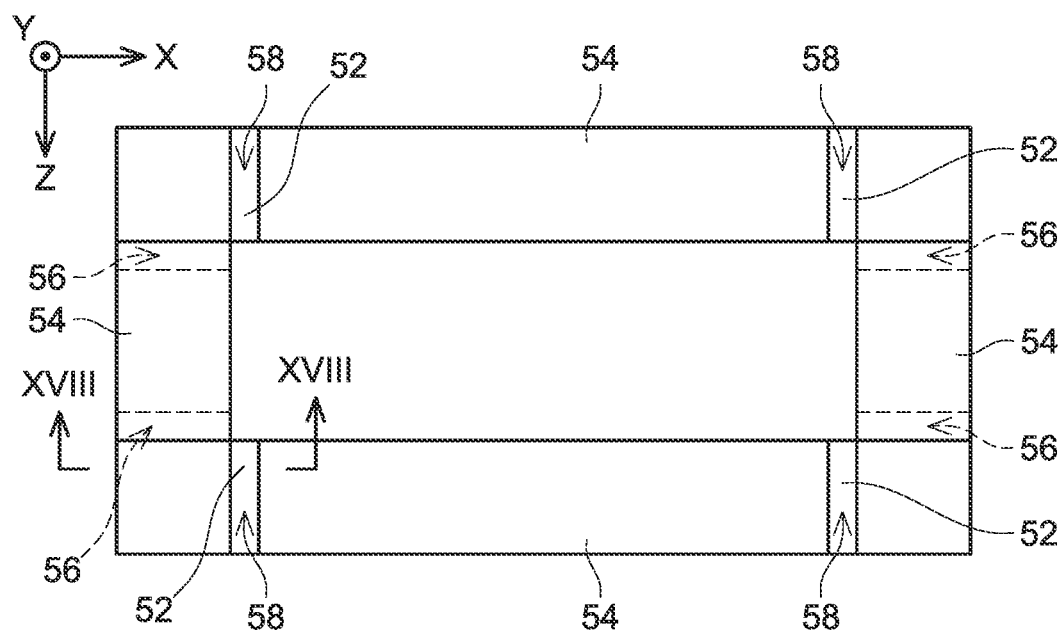
FIG. 17 is a diagram illustrating a process of arranging a plurality of second tape materials 54 on the plurality of first tape materials 52.

After the above, the second tape materials 54 are arranged to define a second interval 58 between each pair of adjacent second tape materials 54, wherein the second intervals 58 are at different positions from the first intervals 56, as illustrated in FIG. 17. Each of the second tape materials 54 has a liner shape having the same width. The plurality of second tape materials 54 incudes a pair of the second tape materials 54 arranged along the longitudinal direction of the electrolyte membrane 22 (which may be termed "longitudinal pair of the second tape materials 54" hereinafter) and a pair of the second tape materials 54 arranged along the transverse direction of the electrolyte membrane 22 (which may be termed "transverse pair of the second tape materials 54" hereinafter). In this case, the length of the transverse pair of the second tape materials 54 is approximately equal to the length of the electrolyte membrane 22 in the transverse direction within the manufacturing tolerance. Here, being within the manufacturing tolerance means being within a range of ±5% from the design value. The length of each of the longitudinal pair of the second tape materials 54 is smaller than the length of the electrolyte membrane 22 in the longitudinal direction, such that when the longitudinal pair of the second tape materials 54 is arranged on the first tape materials 52 (or the electrolyte membrane 22), the second interval 58 is defined between each pair of adjacent second tape materials 54. Thus, the second intervals 58 are defined between ends of the longitudinal pair of the second tape materials 54 and transverse end portions of the pair of second tape materials 54 adjacent to the longitudinal pair. The smaller the second intervals 58 are, the better, although this is non-limiting. For example, the second intervals 58 may be smaller than the width of the second tape materials 54, and may be equal to or smaller than ⅕ of the width. The second tape materials 54 may have linear shapes with different widths. For example, the longitudinal pair of the second tape materials 54 may have a different width from the width of the transverse pair of the second tape materials 54.

According to the manufacturing method, since adjacent first tape materials 52 do not overlap and adjacent second tape materials 54 do not overlap either, unintended stress concentration on the electrolyte membrane 22 of the MEGA 14 and/or the support frame 16 can be avoided. Further, the joining material 34 including the double-layer configuration of the first tape materials 52 and the second tape materials 54 allows for a reduction in the thicknesses of the tape materials 52, 54 configuring the layers, and also allows for a reduction in the space size between the adjacent tape materials 52 and between the adjacent tape materials 54 in the layers. That is, by reducing the thicknesses of the tape materials 52, 54, a difference in the thickness of the tape materials 52, 54 in a Y-axis direction can be reduced between portions where the tape materials 52, 54 are arranged and portions where they are not arranged (the intervals 56, 58). Further, since the second intervals 58 between the second tape materials 54 are at different positions from the first intervals between the first tape materials 52, there is no chance that larger spaces are formed by the intervals 56 connecting with the intervals 58. Thus, a decrease in the sealing performance of the joining material 34 can be avoided or suppressed.

Figure 18:
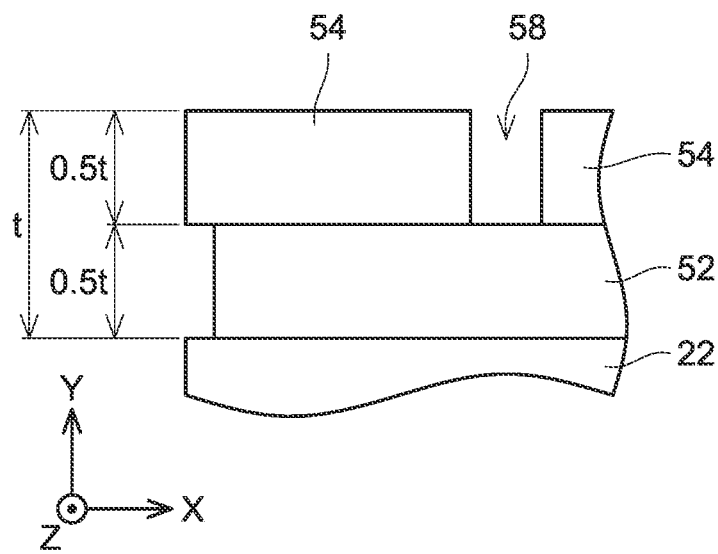
FIG. 18 is a cross-sectional view along a line XVIII-XVIII in FIG. 17 prior to the hot-pressing process.

After the first tape materials 52 and the second tape materials 54 have been arranged, the support frame 16 is arranged on the MEGA 14 or the semi-manufactured product thereof, and then the first and second laser irradiation processes are performed, as described above. After that, the hot-pressing process is performed. Before the hot-pressing process, as illustrated in FIG. 18, the second interval 58 is defined between adjacent second tape materials 54. FIG. 18 illustrates only a part of the joining material 34 including the double-layer structure of the first tape materials 52 and the second tape materials 54 that is required for explanation. The joining material 34 has a thickness t, and the first tape material 52 and the second tape material 54 have, for example, the same thickness of 0.5t. In this case, a portion where the second tape material 54 is stacked on the first tape material 52 has the thickness t, which is the total of the thicknesses of the tape materials 52, 54. On the other hand, a portion where the second interval 58 is defined and only the first tape material 52 is arranged has the thickness 0.5t of the first tape material 52. The joining material 34 may have a thickness ranging from 5 μm to 20 μm, and the tape materials 52, 54 may have a thickness ranging from 2.5 μm to 10 μm, although their thicknesses are not particularly limited.

Figure 19:
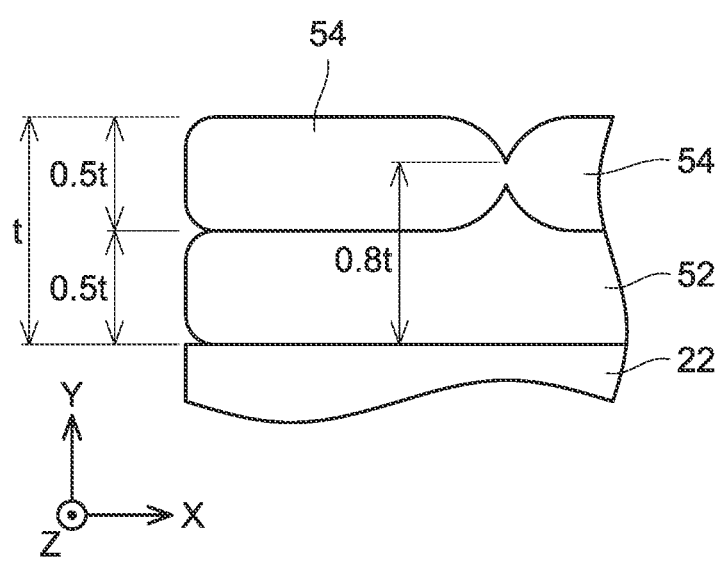
FIG. 19 is a cross-sectional view of FIG. 18 after the hot-pressing process.

After that, when the hot-pressing process is performed, as illustrated in FIG. 19, the tape materials 52, 54 constituted of the thermoplastic material remelt and flow into the second interval 58, thereby joining the adjacent second tape materials 54 with each other. The thicknesses of the tape materials 52, 54 hardly change before and after the hot-pressing process. In other words, the portions where the second tape materials 54 are stacked on the first tape materials 52 have approximately the thickness t, which is the total of the thicknesses of the tape materials 52, 54. To the contrary, in the portions where the second intervals 58 are defined, the tape materials 52, 54 are remelted in the hot-pressing process and flow into the second intervals 58, thereby joining the adjacent second tape materials 54 with each other. Therefore, the portions where the second intervals 58 were once defined have a smaller thickness than the total of the thicknesses of the tape materials 52, 54, which is, for example, a thickness of approximately 0.8t. That is, the thickness of the portions of the joining material 34 where the second intervals 58 were once defined increases from the thickness 0.5t of the first tape materials 52 to the thickness of approximately 0.8t, which is the combined thickness of the tape materials 52, 54. Thus, the difference in the thickness of the joining material 34 can be reduced between the portions where the second tape materials 54 are stacked and the portions where they are not stacked. Similarly, in the first intervals 56 between the first tape materials 52, the tape materials 52, 54 are remelted and the first tape materials 52 are joined with each other by the thermal compression bonding in the hot-pressing process, although this is not illustrated. Thus, the same effect is obtained.

According to the manufacturing method, the support frame 16 and the electrolyte membrane 22 can be firmly joined with each other, while the weak portion of the MEGA 14, such as the electrolyte membrane 22, is more reliably reinforced by welding the joining material 34 extending out from between the support frame 16 and the electrolyte 22 to the electrolyte membrane 22. Further, by covering the surfaces of the electrolyte membrane 22 with the first tape materials 52, the second tape materials 54, the anode catalyst layer 24, and the cathode catalyst layer 26, a leak of gases (e.g., hydrogen gas and oxygen gas) supplied to the electrolyte membrane 22 to the other electrode side through the electrolyte membrane 22 can be suppressed.

What is claimed is:

1. A manufacturing method for a fuel cell, comprising:
preparing an electrode sheet including at least an electrolyte membrane;
arranging a joining material constituted of a thermoplastic resin in a frame shape on the electrolyte membrane;
arranging a support frame having an opening on the joining material arranged on the electrolyte membrane;
performing a first laser irradiation process in which the support frame is irradiated with a laser beam such that a first portion of the joining material between the support frame and the electrolyte membrane melts and the electrolyte membrane and the support frame are welded to each other; and
performing a second laser irradiation process in which a second portion of the joining material that is positioned inside the opening of the support frame is irradiated with a laser beam such that the second portion of the joining material melts and is welded to the electrolyte membrane,
wherein energy per unit area applied to a laser-irradiated area in the second laser irradiation process is less than energy per unit area applied to a laser-irradiated area in the first laser irradiation process.

2. The manufacturing method according to claim 1, wherein an energy density of the laser beam in the second laser irradiation process is lower than an energy density of the laser beam in the first laser irradiation process.

3. The manufacturing method according to claim 1, wherein a scan speed of the laser beam in the second laser irradiation process is faster than a scan speed of the laser beam in the first laser irradiation process.

4. A manufacturing method for a fuel cell, comprising:
preparing an electrode sheet including at least an electrolyte membrane;
arranging a joining material constituted of a thermoplastic resin in a frame shape on the electrolyte membrane;
arranging a support frame having an opening on the joining material arranged on the electrolyte membrane;
performing a first laser irradiation process in which the support frame is irradiated with a laser beam such that a first portion of the joining material between the support frame and the electrolyte membrane melts and the electrolyte membrane and the support frame are welded to each other; and
performing a second laser irradiation process in which a second portion of the joining material that is positioned inside the opening of the support frame is irradiated with a laser beam such that the second portion of the joining material melts and is welded to the electrolyte membrane,
wherein
in the first laser irradiation process, the laser beam is scanned such that the laser beam follows at least once a line extending all a way around the support frame having a frame shape, and
in the second laser irradiation process, the laser beam is scanned such that the laser beam follows at least once a line extending all a way around the second portion of the joining material exposed inside the opening of the support frame in a frame shape.

5. The manufacturing method according to claim 1, wherein
the arranging the joining material in the frame shape comprises:
arranging a plurality of first tape materials constituted of the thermoplastic resin in the frame shape on the electrolyte membrane; and
stacking a plurality of second tape materials constituted of the thermoplastic resin in the frame shape on the plurality of first tape materials,
the first tape materials are arranged to define a first interval between each pair of the first tape materials, and
the second tape materials are arranged to define a second interval between each pair of the second tape materials, wherein the second intervals are at different positions from the first intervals.

6. The manufacturing method according to claim 5, wherein each of the plurality of first tape materials and each of the plurality of second tape materials have a linear shape having a same width.

7. The manufacturing method according to claim 5, further comprising:
performing a hot-pressing process after the first laser irradiation process and the second laser irradiation process,
wherein in the hot-pressing process, the first portion of the joining material remelts and the electrolyte membrane and the support frame are bonded by thermal compression bonding.

8. The manufacturing method according to claim 7, wherein in the hot-pressing process, at least a gas diffusion layer is bonded to the electrode sheet by thermal compression bonding at a same time as the electrolyte membrane and the support frame are bonded by thermal compression bonding.

9. A manufacturing method for a fuel cell, comprising:
preparing an electrode sheet including at least an electrolyte membrane;
arranging a joining material constituted of a thermoplastic resin in a frame shape on the electrolyte membrane;
arranging a support frame having an opening on the joining material arranged on the electrolyte membrane; and
melting the joining material to bond the electrolyte membrane and the support frame by thermal compression bonding,
wherein
the arranging the joining material in the frame shape comprises:
arranging a plurality of first tape materials constituted of the thermoplastic resin in the frame shape on the electrolyte membrane; and
stacking a plurality of second tape materials constituted of the thermoplastic resin in the frame shape on the plurality of first tape materials,
the first tape materials are arranged to define a first interval between each pair of the first tape materials, and
the second tape materials are arranged to define a second interval between each pair of the second tape materials, wherein the second intervals are at different positions from the first intervals.

* * * * *